(12) United States Patent
He et al.

(10) Patent No.: US 10,908,889 B2
(45) Date of Patent: *Feb. 2, 2021

(54) METHOD, USER EQUIPMENT, AND APPLICATION SERVER FOR DOWNLOADING APPLICATION

(71) Applicant: Huawei Device Co., Ltd., Guangdong (CN)

(72) Inventors: Zhiqin He, Shenzhen (CN); Liu Fang, Shenzhen (CN); Hongjie Yao, Shenzhen (CN); Zheng Xu, Shenzhen (CN); Kewen Wu, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,405

(22) Filed: Dec. 11, 2019

(65) Prior Publication Data

US 2020/0125346 A1     Apr. 23, 2020

Related U.S. Application Data

(63) Continuation of application No. 15/830,887, filed on Dec. 4, 2017, now Pat. No. 10,558,448, which is a
(Continued)

(30) Foreign Application Priority Data

Jul. 27, 2012   (CN) ........................ 2012 1 0264103

(51) Int. Cl.
*G06F 8/61*     (2018.01)
*G06F 8/60*     (2018.01)

(52) U.S. Cl.
CPC .................. *G06F 8/61* (2013.01); *G06F 8/60* (2013.01); *G06F 8/64* (2013.01)

(58) Field of Classification Search
None
See application file for complete search history.

(56) References Cited

U.S. PATENT DOCUMENTS 5,909,581 A      6/1999 Park
2008/0229304 A1  9/2008 Bengtsson et al.
(Continued)

FOREIGN PATENT DOCUMENTS

CN    1374589 A     10/2002
CN    101647252 A   2/2010
(Continued)

OTHER PUBLICATIONS

Machine Translation and Abstract of Chinese Publication No. CN101840343, dated Sep. 22, 2010, 14 pages.
(Continued)

*Primary Examiner* — Wynuel S Aquino
*Assistant Examiner* — Mark A Gooray
(74) *Attorney, Agent, or Firm* — Conley Rose, P.C.

(57) ABSTRACT

A method for downloading an application includes, after learning that an application is downloaded by a second user equipment, sending, by a first user equipment that has an association relationship with the second user equipment, a downloading request for the application downloaded by the second user equipment to an application server, where the downloading request carries capability information of the first user equipment, and receiving, by the first user equipment, an application to be downloaded, where the application matches the capability information of the first user equipment and is sent by the application server.

16 Claims, 8 Drawing Sheets

Related U.S. Application Data continuation of application No. 14/586,252, filed on Dec. 30, 2014, now Pat. No. 9,864,591, which is a continuation of application No. PCT/CN2013/079008, filed on Jul. 8, 2013.

(56) References Cited

U.S. PATENT DOCUMENTS

| | | |
|---|---|---|
| 2010/0312817 A1 | 12/2010 | Steakley |
| 2011/0055355 A1 | 3/2011 | Lee et al. |
| 2011/0258301 A1 | 10/2011 | McCormick et al. |
| 2011/0289496 A1 | 11/2011 | Steer |
| 2012/0110568 A1 | 5/2012 | Abel et al. |
| 2012/0191657 A1 | 7/2012 | Weinstein et al. |
| 2014/0007084 A1 | 1/2014 | Ding |
| 2014/0137090 A1 | 5/2014 | Whitcomb et al. |
| 2014/0245290 A1 | 8/2014 | Gupta et al. |

FOREIGN PATENT DOCUMENTS

| | | | |
|---|---|---|---|
| CN | 101795392 | A | 8/2010 |
| CN | 101808311 | A | 8/2010 |
| CN | 101840343 | A | 9/2010 |
| CN | 101997908 | A | 3/2011 |
| CN | 102137469 | A | 7/2011 |
| CN | 102176695 | A | 9/2011 |
| CN | 102262552 | A | 11/2011 |
| CN | 102404338 | A | 4/2012 |
| CN | 102480501 | A | 5/2012 |
| CN | 102523021 | A | 6/2012 |
| CN | 102609277 | A | 7/2012 |
| EP | 2119182 | | 11/2009 |
| EP | 2706719 | A1 | 12/2014 |
| WO | 20080110188 | A1 | 8/2008 |
| WO | 2011123532 | A1 | 10/2011 |
| WO | 2012027605 | A2 | 3/2012 |

OTHER PUBLICATIONS

Machine Translation and Abstract of Chinese Publication No. CN102137469, dated Jul. 27, 2011, 15 pages.

Machine Translation and Abstract of Chinese Publication No. CN102176695, dated Sep. 7, 2011, 25 pages.

Foreign Communication From a Counterpart Application, Chinese Application No. 201210264103.X, Chinese Search Report dated Aug. 22, 2016, 2 pages.

Foreign Communication From a Counterpart Application, Chinese Application No. 201210264103.X, Chinese Office Action dated Aug. 30, 2016, 5 pages.

Foreign Communication From a Counterpart Application, European Application No. 13823373.9, Extended European Search Report dated Jun. 8, 2015, 8 pages.

Foreign Communication From a Counterpart Application, PCT Application No. PCT/CN2013/079008, English Translation of International Search Report dated Oct. 17, 2013, 2 pages.

Foreign Communication From a Counterpart Application, PCT Application No. PCT/CN2013/079008, English of Written Opinion dated Oct. 17, 2013, 17 pages.

Foreign Communication From a Counterpart Application, Chinese Application No. 201710562605.3, Chinese Office Action dated Oct. 22, 2019, 9 pages.

METHOD, USER EQUIPMENT, AND APPLICATION SERVER FOR DOWNLOADING APPLICATION

CROSS-REFERENCE TO RELATED APPLICATION

This application is a continuation of U.S. patent application Ser. No. 15/830,887 filed on Dec. 4, 2017, which is a continuation of U.S. patent application Ser. No. 14/586,252 filed on Dec. 30, 2014, now U.S. Pat. No. 9,864,591, which is a continuation of International Patent Application No. PCT/CN2013/079008 filed on Jul. 8, 2013, which claims priority to Chinese Patent Application No. 201210264103.X filed on Jul. 27, 2012. All of the afore-mentioned patent applications are hereby incorporated by reference in their entireties.

TECHNICAL FIELD

The present disclosure relates to the field of user equipment, and more specifically, to a method, a user equipment, and an application server for downloading an application.

BACKGROUND

At present, a variety of terminal products, also known as user equipment (UE), are available on the market, and appear in multiple forms, such as a mobile phone, a tablet computer, a desktop computer, and a television (TV). Hardware capabilities, such as a screen size and screen resolution, of these user equipment are different. In addition, software capabilities, such as a supported media format and an operating system, may also be different. A same type of user equipment, such as mobile phones, may even differ in software and hardware capabilities.

Because hardware capabilities are inconsistent, most applications (APPs) cannot be automatically compatible. To improve a resource utilization ratio of a user equipment and experience of users using different user equipment, designers provide different software versions, such as a mobile phone version or a tablet computer version, for different types of user equipment. For example, after a mobile phone of a user downloads an application from an application server, if the user wants to apply the application to a tablet computer of the user, the user manually needs to further download a corresponding version on the tablet computer; and if the user wants to apply the application to a TV of the user, the user needs to further download another corresponding version on the TV manually.

For a same application, different versions need to be manually selected to be downloaded for different user equipment. The foregoing method for downloading an application is not flexible enough.

SUMMARY

In view of this, embodiments of the present disclosure provide a method, a user equipment, and an application server for downloading an application, so as to solve a problem that flexibility of downloading an application is relatively poor.

According to a first aspect, a method for downloading an application is provided, including, after learning an application downloaded by a second user equipment, sending, by a first user equipment that has an association relationship with the second user equipment, to an application server, a downloading request for the application downloaded by the second user equipment, where the downloading request carries capability information of the first user equipment, and receiving, by the first user equipment, an application to be downloaded, where the application matches the capability information of the first user equipment and is sent by the application server.

In a first possible implementation manner, the learning, by a first user equipment that has an association relationship with a second user equipment, an application downloaded by the second user equipment includes receiving, by the first user equipment, a downloading notification sent by the second user equipment, and learning, by the first user equipment, according to the downloading notification, the application downloaded by the second user equipment, or receiving, by the first equipment, a downloading notification sent by the application server, and learning, by the first user equipment, according to the downloading notification, the application downloaded by the second user equipment.

With reference to the first aspect or the first possible implementation manner of the first aspect, in a second possible implementation manner, before the learning, by a first user equipment that has an association relationship with a second user equipment, an application downloaded by the second user equipment, the method further includes generating, by the first user equipment, the association relationship between the first user equipment and the second user equipment, or receiving, by the first user equipment, the association relationship between the first user equipment and the second user equipment, where the association relationship is generated and sent by the application server or the second user equipment.

With reference to the first aspect or the foregoing possible implementation manners of the first aspect, in a third possible implementation manner, the association relationship between the first user equipment and the second user equipment is generated according to at least one piece of the following information: account information and a hardware device identifier.

With reference to the first aspect or the foregoing possible implementation manners of the first aspect, in a fourth possible implementation manner, the capability information of the first user equipment includes one or more pieces of the following information: an operating system, a screen size, screen resolution, and a supported media format.

According to a second aspect, a method for downloading an application is provided, including receiving, by a second user equipment, an application to be downloaded, where the application matches capability information of the second user equipment and is sent by an application server in response to a downloading request sent by the second user equipment, and sending, by the second user equipment, a downloading notification to a first user equipment that has an association relationship with the second user equipment, where the downloading notification is used to notify the first user equipment of the application received by the second user equipment.

In a first possible implementation manner, before the receiving, by a second user equipment, an application, wherein the application matches capability information of the second user equipment and is sent by an application server in response to a downloading request sent by the second user equipment, the method further includes sending, by the second user equipment, the downloading request to the application server, where the downloading request carries the capability information of the second user equipment.

With reference to the second aspect or the first possible implementation manner of the second aspect, in a second possible implementation manner, before the sending, by the second user equipment, a downloading notification to a first user equipment that has an association relationship with the second user equipment, the method further includes generating, by the second user equipment, the association relationship between the first user equipment and the second user equipment, or receiving, by the second user equipment, the association relationship between the first user equipment and the second user equipment, where the association relationship is generated and sent by the application server or the first user equipment.

With reference to the second aspect or the foregoing possible implementation manners of the second aspect, in a third possible implementation manner, the association relationship between the first user equipment and the second user equipment is generated according to at least one piece of the following information: account information and a hardware device identifier.

With reference to the second aspect or the foregoing possible implementation manners of the second aspect, in a fourth possible implementation manner, the capability information of the second user equipment includes one or more pieces of the following information: an operating system, a screen size, screen resolution, and a supported media format.

According to a third aspect, a method for downloading an application is provided, including sending, by an application server, a downloading notification to a first user equipment, where the downloading notification is used to notify the first user equipment of an application downloaded by a second user equipment, where the second user equipment has an association relationship with the first user equipment, receiving, by the application server, a first downloading request for the application downloaded by the second user equipment, where the first downloading request is sent by the first user equipment according to the downloading notification, and the first downloading request carries capability information of the first user equipment, and sending, by the application server, an application to the first user equipment for downloading, where the application matches the capability information of the first user equipment.

In a first possible implementation manner, before the sending, by an application server, a downloading notification to a first user equipment, the method further includes receiving, by the application server, a second downloading request sent by the second user equipment, where the second downloading request carries capability information of the second user equipment, and sending, by the application server, an application to be downloaded to the second user equipment in response to the second downloading request, where the application matches the capability information of the second user equipment.

With reference to the third aspect or the first possible implementation manner of the third aspect, in a second possible implementation manner, before the sending, by an application server, a downloading notification to a first user equipment, the method further includes generating, by the application server, the association relationship between the first user equipment and the second user equipment, or receiving, by the application server, the association relationship between the first user equipment and the second user equipment, where the association relationship is generated and sent by the first user equipment or the second user equipment.

According to a fourth aspect, a user equipment is provided, including a sending unit and a first receiving unit, where the sending unit is configured to, after the user equipment learns an application downloaded by another user equipment that has an association relationship with the user equipment, send, to an application server, a downloading request for the application downloaded by the another user equipment, where the downloading request carries capability information of the user equipment, and the first receiving unit is configured to receive an application to be downloaded, where the application matches the capability information of the user equipment and is sent by the application server based on the downloading request sent by the sending unit.

In a first possible implementation manner, a second receiving unit is further included, where the second receiving unit is configured to receive a downloading notification sent by the another user equipment, so that the user equipment learns, according to the downloading notification, the application downloaded by the another user equipment, or the first receiving unit is further configured to receive a downloading notification sent by the application server, so that the user equipment learns, according to the downloading notification, the application downloaded by the another user equipment.

With reference to the fourth aspect or the foregoing possible implementation manner of the fourth aspect, in a second possible implementation manner, the user equipment further includes a generating unit, where the generating unit generates the association relationship between the user equipment and the another user equipment, or the first receiving unit receives the association relationship between the user equipment and the another user equipment, where the association relationship is generated and sent by the application server, or the second receiving unit receives the association relationship between the user equipment and the another user equipment, where the association relationship is generated and sent by the another user equipment.

With reference to the fourth aspect or the foregoing possible implementation manners of the fourth aspect, in a third possible implementation manner, the generating unit generates the association relationship between the user equipment and the another user equipment according to at least one piece of the following information: account information and a hardware device identifier.

With reference to the fourth aspect or the foregoing possible implementation manners of the fourth aspect, in a fourth possible implementation manner, the capability information, used by the sending unit, of the user equipment includes one or more pieces of the following information: an operating system, a screen size, screen resolution, and a supported media format.

According to a fifth aspect, a user equipment is provided, including a first receiving unit and a first sending unit, where the first receiving unit is configured to receive an application to be downloaded, where the application matches capability information of the user equipment and is sent by an application server in response to a downloading request sent by the user equipment, and the first sending unit is configured to send a downloading notification to another user equipment that has an association relationship with the user equipment, where the downloading notification is used to notify the another user equipment of the application received by the first receiving unit.

In a first possible implementation manner, a second sending unit is further included, where the second sending unit is configured to send the downloading request to the application server, where the downloading request carries the capability information of the user equipment.

With reference to the fifth aspect or the foregoing possible implementation manner of the fifth aspect, in a second possible implementation manner, a generating unit and a second receiving unit are further included, where the generating unit is configured to generate the association relationship between the user equipment and the another user equipment, or the first receiving unit is further configured to receive an association relationship between a first user equipment and a second user equipment, where the association relationship is generated and sent by the application server, or the second receiving unit is configured to receive an association relationship between a first user equipment and a second user equipment, where the association relationship is generated and sent by the another user equipment.

According to a sixth aspect, an application server is provided, including a first sending unit and a first receiving unit, where the first sending unit is configured to send a downloading notification to a first user equipment, where the downloading notification is used to notify the first user equipment of an application downloaded by a second user equipment, where the second user equipment has an association relationship with the first user equipment; the first receiving unit is configured to receive a first downloading request for the application downloaded by the second user equipment, where the first downloading request is sent by the first user equipment according to the downloading notification sent by the first sending unit, and the first downloading request carries capability information of the first user equipment, and the first sending unit is further configured to send, based on the first downloading request received by the first receiving unit, an application to the first user equipment for downloading, where the application matches the capability information of the first user equipment.

In a first possible implementation manner, a second receiving unit and a second sending unit are further included, where the second receiving unit is configured to receive a second downloading request sent by the second user equipment, where the second downloading request carries capability information of the second user equipment, and the second sending unit is configured to send an application to be downloaded to the second user equipment in response to the second downloading request received by the second receiving unit, where the application matches the capability information of the second user equipment.

With reference to the sixth aspect or the foregoing possible implementation manner of the sixth aspect, in a second possible implementation manner, a generating unit is further included, where the generating unit is configured to generate the association relationship between the first user equipment and the second user equipment, or the first receiving unit receives the association relationship between the first user equipment and the second user equipment, where the association relationship is generated and sent by the first user equipment, or the second receiving unit receives the association relationship between the first user equipment and the second user equipment, where the association relationship is generated and sent by the second user equipment.

With reference to the sixth aspect or the foregoing possible implementation manners of the sixth aspect, in a third possible implementation manner, the generating unit generates the association relationship between the first user equipment and the second user equipment according to at least one piece of the following information: account information and a hardware device identifier.

Using the foregoing technical solutions, after learning an application downloaded by a second user equipment that has an association relationship with a first user equipment, the first user equipment can automatically obtain, by providing capability information of the first user equipment and from an application server, an application to be downloaded, where the application matches the capability information of the first user equipment, thereby saving manual operation and improving flexibility of downloading an application.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
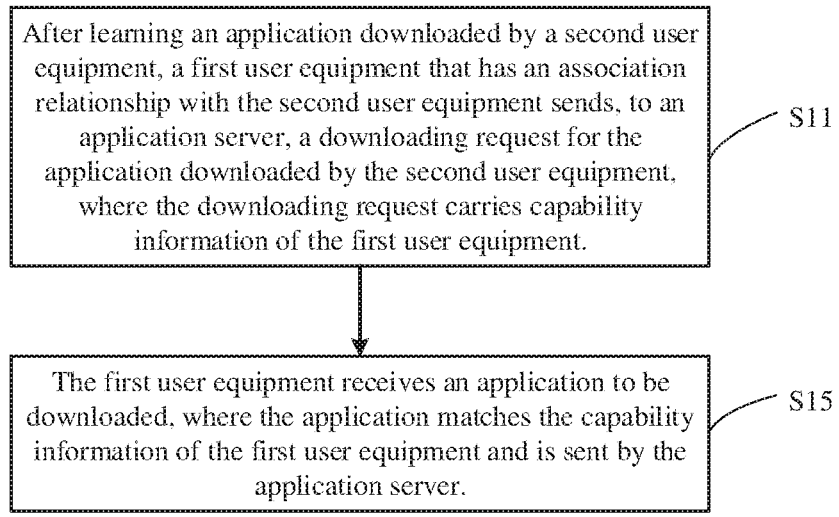
FIG. 1 is a schematic flowchart of a method for downloading an application according to Embodiment 1 of the present disclosure.

FIG. 1 is a schematic flowchart of a method 10 for downloading an application according to Embodiment 1 of the present disclosure. The method 10 is executed by a user equipment and includes the following content.

S11: After learning an application downloaded by a second user equipment, a first user equipment that has an association relationship with the second user equipment sends, to an application server, a downloading request for the application downloaded by the second user equipment, where the downloading request carries capability information of the first user equipment.

S15: The first user equipment receives an application to be downloaded, where the application matches the capability information of the first user equipment and is sent by the application server.

The application in this specification is a product that is provided for a user equipment by a software developer, a service operator, or the like. An application matching capability information of a specific user equipment may be an application that is used as a different version of a product.

The embodiment of the present disclosure provides a method for downloading an application. After learning an application downloaded by a second user equipment that has an association relationship with a first user equipment, the first user equipment can automatically obtain, by providing capability information of the first user equipment and from an application server, an application to be downloaded, where the application matches the capability information of the first user equipment, thereby saving manual operation and improving flexibility of downloading an application.

As a different embodiment, the method 10 may further include the following content.

Optionally, that a first user equipment that has an association relationship with a second user equipment learns an application downloaded by the second user equipment includes that the first user equipment receives a downloading notification sent by the second user equipment, and learning, by the first user equipment, according to the downloading notification, the application downloaded by the second user equipment, or the first user equipment receives a downloading notification sent by the application server, and the learning, by the first user equipment, according to the downloading notification, the application downloaded by the second user equipment.

Optionally, before a first user equipment that has an association relationship with a second user equipment learns an application downloaded by the second user equipment, the method further includes that the first user equipment generates the association relationship between the first user equipment and the second user equipment, or the first user equipment receives the association relationship between the first user equipment and the second user equipment, where the association relationship is generated and sent by the application server or the second user equipment.

Optionally, the association relationship between the first user equipment and the second user equipment is generated according to at least one piece of the following information: account information and a hardware device identifier.

Optionally, the capability information of the first user equipment includes one or more pieces of the following information: an operating system, a screen size, screen resolution, and a supported media format.

Figure 2:
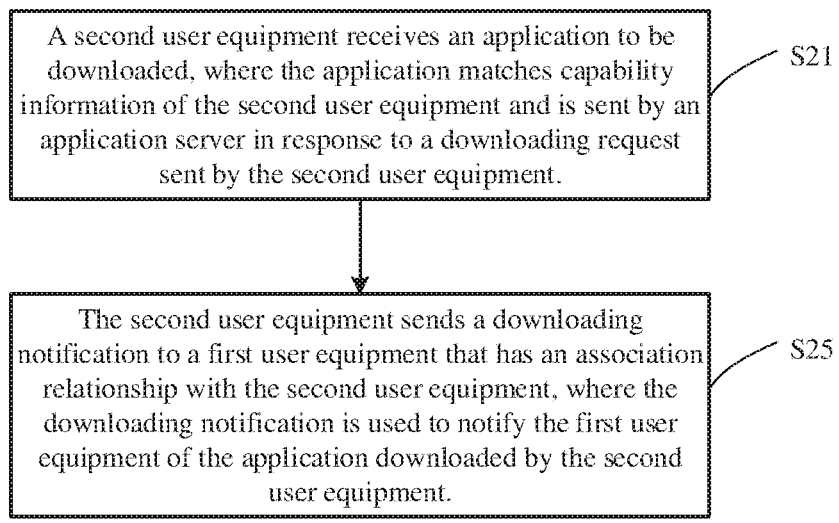
FIG. 2 is a schematic flowchart of a method for downloading an application according to Embodiment 2 of the present disclosure.

FIG. 2 is a schematic flowchart of a method 20 for downloading an application according to Embodiment 2 of the present disclosure. The method 20 is executed by a user equipment and includes the following content.

S21: A second user equipment receives an application to be downloaded, where the application matches capability information of the second user equipment and is sent by an application server in response to a downloading request sent by the second user equipment.

S25: The second user equipment sends a downloading notification to a first user equipment that has an association relationship with the second user equipment, where the downloading notification is used to notify the first user equipment of the application downloaded by the second user equipment.

The application in this specification is a product that is provided for a user equipment by a software developer, a service operator, or the like. An application matching capability information of a specific user equipment may be an application that is used as a different version of a product.

The embodiment of the present disclosure provides a method for downloading an application. After learning an application downloaded by a second user equipment that has an association relationship with a first user equipment, the first user equipment can automatically obtain, by providing capability information of the first user equipment and from an application server, an application to be downloaded, where the application matches the capability information of the first user equipment, thereby saving manual operation and improving flexibility of downloading an application.

As a different embodiment, the method 20 may further include the following content.

Optionally, before a second user equipment receives an application, where the application matches capability information of the second user equipment and is sent by an application server in response to the downloading request sent by the second user equipment, the method further includes that the second user equipment sends the downloading request to the application server, where the downloading request carries the capability information of the second user equipment.

Optionally, before the second user equipment sends a downloading notification to a first user equipment that has an association relationship with the second user equipment, the method further includes that the second user equipment generates the association relationship between the first user equipment and the second user equipment, or the second user equipment receives the association relationship between the first user equipment and the second user equipment, where the association relationship is generated and sent by the application server or the first user equipment.

Optionally, the association relationship between the first user equipment and the second user equipment is generated according to at least one piece of the following information: account information and a hardware device identifier.

Optionally, the capability information of the second user equipment includes one or more pieces of the following information: an operating system, a screen size, screen resolution, and a supported media format.

Figure 3:
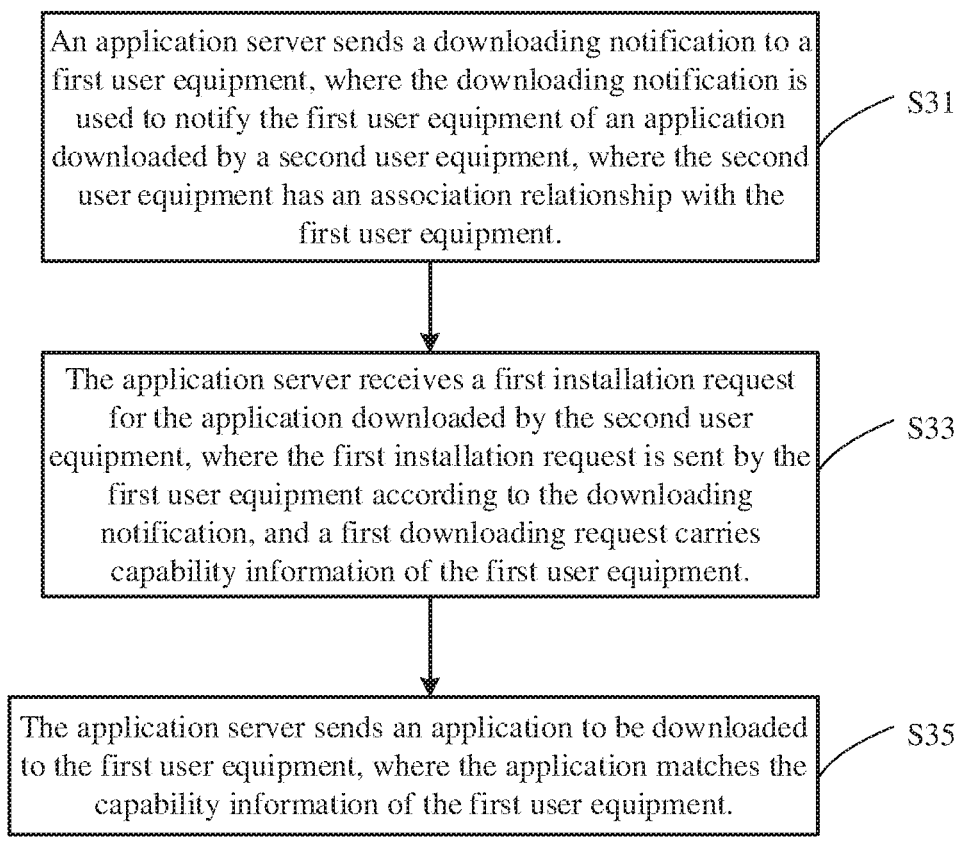
FIG. 3 is a schematic flowchart of a method for downloading an application according to Embodiment 3 of the present disclosure.

FIG. 3 is a schematic flowchart of a method 30 for downloading an application according to Embodiment 3 of the present disclosure. The method 30 is executed by an application server and includes the following content.

S31: An application server sends a downloading notification to a first user equipment, where the downloading notification is used to notify the first user equipment of an application downloaded by a second user equipment, where the second user equipment has an association relationship with the first user equipment.

S33: The application server receives a first downloading request for the application downloaded by the second user equipment, where the first downloading request is sent by the first user equipment according to the downloading notification, and the first downloading request carries capability information of the first user equipment.

S35: The application server sends an application to be downloaded to the first user equipment, where the application matches the capability information of the first user equipment.

The application in this specification is a product that is provided for a user equipment by a software developer, a service operator, or the like. An application matching capability information of a specific user equipment may be an application that is used as a different version of a product.

The embodiment of the present disclosure provides a method for downloading an application. After learning an application downloaded by a second user equipment that has an association relationship with a first user equipment, the first user equipment can automatically obtain, by providing capability information of the first user equipment and from an application server, an application to be downloaded, where the application matches the capability information of the first user equipment, thereby saving manual operation and improving flexibility of downloading an application.

As a different embodiment, the method 30 may further include the following content.

Optionally, before an application server sends a downloading notification to a first user equipment, the method further includes that the application server receives a second downloading request sent by the second user equipment, where the second downloading request carries capability information of the second user equipment, and the application server sends an application to be downloaded to the second user equipment in response to the second downloading request, where the application matches the capability information of the second user equipment.

Optionally, before an application server sends a downloading notification to a first user equipment, the method further includes that the application server generates the association relationship between the first user equipment and the second user equipment, or the application server receives the association relationship between the first user equipment and the second user equipment, where the association relationship is generated and sent by the first user equipment or the second user equipment.

Figure 4:
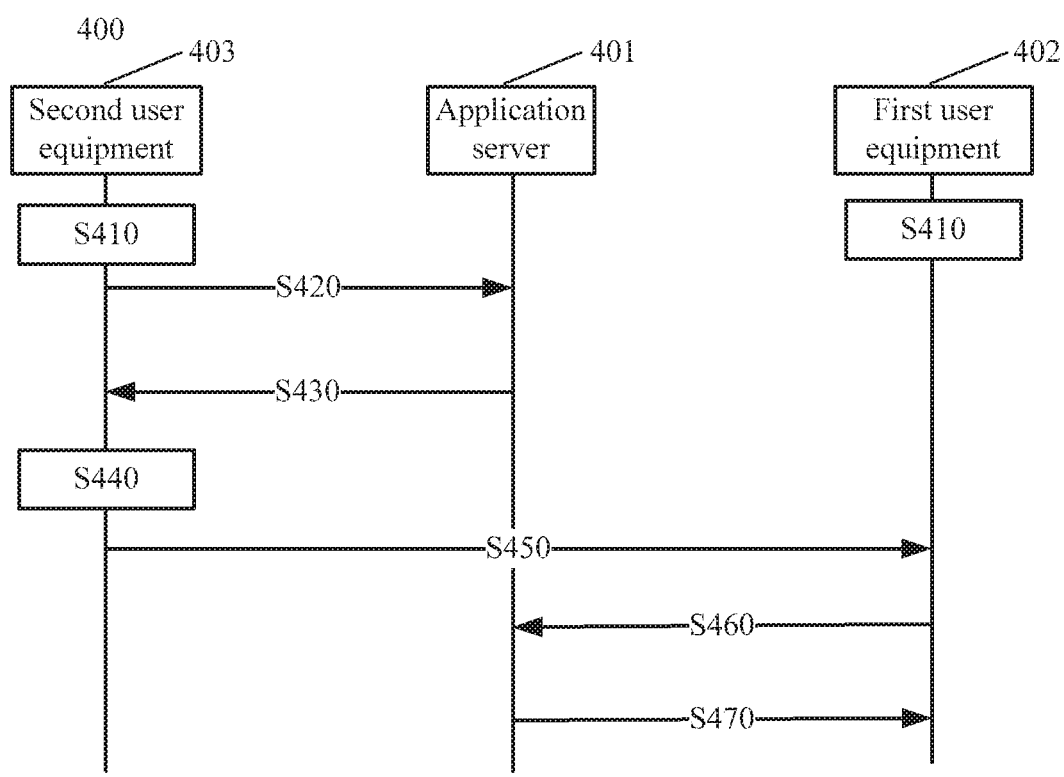
FIG. 4 is a schematic interaction diagram of a method for downloading an application according to Embodiment 4 of the present disclosure.

FIG. 4 is a schematic interaction diagram of a method 400 for downloading an application according to Embodiment 4 of the present disclosure. To facilitate description of interaction between a user equipment and an application server 401, in this embodiment, two different user equipment 402 and 403 are identified only using first and second. However, there may be more than two user equipment in the embodiment of the present disclosure. A scenario in which the method 400 is applied may include one first user equipment, one second user equipment, and an application server, may include one first user equipment, multiple second user equipment and an application server, may include multiple first user equipment, one second user equipment, and an application server, or may include multiple first user equipment, multiple second user equipment, and an application server. When there are multiple first user equipment or multiple second user equipment, flexibility of downloading an application by a user equipment can be improved, and more prominently, a lot of labor is saved. The method 400 includes the following content.

S410: A second user equipment has established an association relationship with a first user equipment.

According to the foregoing association relationship, the second user equipment establishes an association with another device such as the first user equipment. The association relationship may be generated and stored by any user equipment, the association relationship may be generated by one of the user equipment and sent to another user equipment, an application server, or the like, or the association relationship may be generated by another device such as an application server and then sent to a user equipment, and is stored by the user equipment. In an implementation manner, after a device using the method provided in the embodiment of the present disclosure establishes an association relationship between devices, the foregoing association relationship can be interacted, updated, or unified using signaling between the devices.

In addition, there are multiple methods for generating an association relationship. The association relationship between the second user equipment and the first user equipment may be generated according to one or more pieces of the following information, for example, account information and a hardware device identifier. For example, the second user equipment and the first user equipment that use common account information can be associated using information of an account for logging in to, for example, an application server. For another example, the second user equipment and the first user equipment can be associated according to an association list using a hardware device identifier of the second user equipment and a hardware device identifier of the first user equipment, for example, an international mobile equipment identity (IMEI) of a mobile phone or a tablet computer, a hardware address of a desktop computer, that is, a Media Access Control (MAC) address, or a factory serial number of the foregoing device.

S420: The second user equipment sends a second downloading request to an application server after selecting a product, where the second downloading request carries capability information of the second user equipment.

Herein, the second user equipment first selects a to-be-downloaded product from an electronic market, where the product is an application provided by a service provider or manufacturer using the background application server.

S430: The application server sends an application to be downloaded to the second user equipment in response to the second downloading request, where the application matches the capability information of the second user equipment.

The application server 401 can provide various user equipment with multiple applications for downloading and/or installation. For a same application, the application server provides different versions of the same application according to different hardware capability information of user equipment, for example, a screen size, screen resolution, or a supported media format, and/or according to different software capability information of user equipment, for example, an operating system.

S440: The second user equipment learns, by querying the association relationship, the first user equipment that has the association relationship with the second user equipment.

The second user equipment may query the association relationship generated by the second user equipment, or may request the association relationship from another device or automatically receive the association relationship from another device that generates the association relationship.

S450: The second user equipment sends a downloading notification to the first user equipment, where the downloading notification is used to notify the first user equipment of the application downloaded by the second user equipment.

The second user equipment notifies the first user equipment of the downloaded application. For example, a mobile phone and a TV access a same network, and the mobile phone notifies the TV using network signaling, where the signaling carries a name of an application downloaded by the mobile phone. In another scenario, after the mobile phone and the TV are connected in a wireless manner, for example, the mobile phone and the TV are paired using a Bluetooth technology, and the application downloaded by the mobile phone is notified to the TV using Bluetooth signaling.

S460: After learning, according to the foregoing downloading notification, the application downloaded by the second user equipment, the first user equipment sends a first downloading request to the application server, where the first downloading request carries capability information of the first user equipment.

S470: The application server sends an application to be downloaded to the first user equipment in response to the first downloading request, where the application matches the capability information of the first user equipment.

For example, after a mobile phone used as a second user equipment downloads a new application that matches capability information of the mobile phone, the mobile phone sends a notification to an associated first user equipment, for example, a television, where the notification is used to notify the television of the application downloaded by the mobile phone. Afterward, the television actively sends, to an application server, a downloading request carrying capability information of the television, and receives an application that matches the capability information of the television and is sent by the application server according to the downloading request. In this way, applications matching software capabilities and hardware capabilities of different user equipment enable the user equipment to use resources of the user equipment to a maximum extent, thereby improving user experience from one or several aspects such as a response speed and a presentation effect. Compared with that a first or second user equipment can only separately select to download or download an application, in the embodiment of the present disclosure, that a second user equipment can implement associated downloading with the second user equipment improves flexibility of downloading an application. Moreover, when there are multiple first user equipment or multiple second user equipment, in the embodiment of the present disclosure, labor can be greatly saved and flexibility of downloading an application can be improved, thereby improving convenience for a user.

The embodiment of the present disclosure provides a method for downloading an application. After learning an application downloaded by a second user equipment that has an association relationship with a first user equipment, the first user equipment can automatically obtain, by providing capability information of the first user equipment and from an application server, an application to be downloaded, where the application matches the capability information of the first user equipment, thereby saving labor and improving flexibility of downloading an application.

Figure 5:
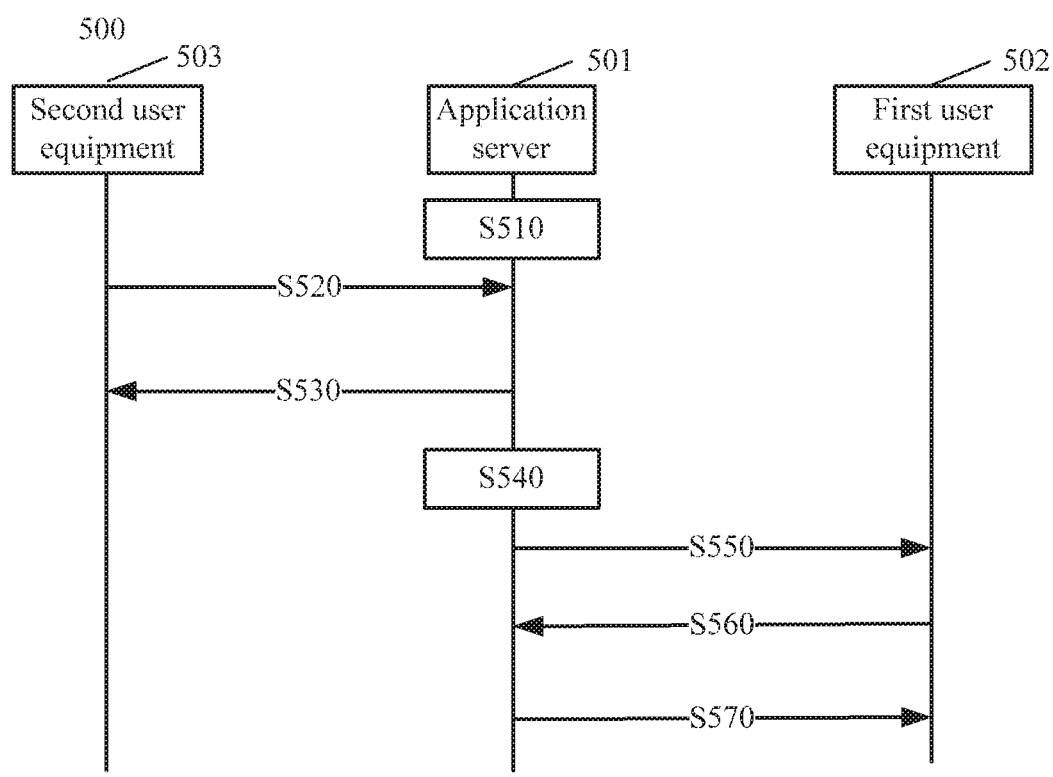
FIG. 5 is a schematic interaction diagram of a method for downloading an application according to Embodiment 5 of the present disclosure.

FIG. 5 is a schematic interaction diagram of a method 500 for downloading an application according to Embodiment 5 of the present disclosure. Similar to FIG. 4, for ease of description. FIG. 5 shows only an application server 501, a first user equipment 502, and a second user equipment 503. There may be more than two user equipment in this embodiment, and an application scenario also includes the foregoing multiple situations. The method 500 includes the following content.

S510: An application server has stored an association relationship between a second user equipment and a first user equipment.

According to the foregoing association relationship, the second user equipment establishes an association with another device such as the first user equipment. The association relationship may be generated by a user equipment and stored by an application server, or the association relationship may be generated by an application server and then stored by a user equipment. In an implementation manner, after a device using the method provided in the embodiment of the present disclosure establishes an association relationship between devices, the foregoing association relationship can be interacted, updated, or unified using signaling between the devices.

In addition, there are multiple methods for generating an association relationship. The association relationship between the second user equipment and the first user equipment may be generated according to one or more pieces of the following information, for example, account information and a hardware device identifier. For example, the second user equipment and the first user equipment that use common account information can be associated using information of an account for logging in to, for example, an application server. For another example, the second user equipment and the first user equipment can be associated according to an association list using a hardware device identifier of the second user equipment and a hardware device identifier of the first user equipment, for example, MAC.

S520: The second user equipment sends a second downloading request to the application server after selecting a product, where the second downloading request carries capability information of the second user equipment.

Herein, the second user equipment first selects a to-be-downloaded product from an electronic market, where the product is an application provided by a service provider or manufacturer using the background application server.

S530: The application server sends an application to be downloaded to the second user equipment in response to the second downloading request, where the application matches the capability information of the second user equipment.

The application server can provide various user equipment with multiple applications for downloading and/or installation. For a same application, the application server provides different versions of the same application according to different hardware capability information of user equipment, for example, a screen size, screen resolution, or a supported media format, and/or according to different software capability information of user equipment, for example, an operating system.

S540: The application server learns, by querying the stored association relationship, the first user equipment that has the association relationship with the second user equipment.

A difference from embodiment 2 lies in that the application server in the embodiment 3 can store an association relationship. Herein, after sending, to the second user equipment, the application that matches the capability information, the application server may actively send a downloading notification to the first user equipment associated with the second user equipment.

S550: The application server sends a downloading notification to the first user equipment, where the downloading notification is used to notify the first user equipment of the application downloaded by the second user equipment.

The application server notifies the first user equipment of the downloaded application. For example, the downloading notification may be sent when the first user equipment logs in to the application server, or may be sent when the first user equipment is in a power-on state. A notification form or method is not limited in the embodiment of the present disclosure.

S560: After learning, according to the foregoing downloading notification, the application downloaded by the second user equipment, the first user equipment sends a first downloading request to the application server, where the first downloading request carries capability information of the first user equipment.

S570: The application server sends an application to be downloaded to the first user equipment in response to the first downloading request, where the application matches the capability information of the first user equipment.

For example, after an application server provides an application for a mobile phone used as a second user equipment, where the application matches capability information of the second user equipment, the application server sends a notification to a first user equipment associated with the second user equipment, for example, a television, where the notification is used to notify the television of the application downloaded by the mobile phone. Afterward, the television actively sends, to the application server, a downloading request carrying capability information of the television, and receives an application that matches the capability information of the television and is sent by the application server according to the downloading request. In this way, applications matching software capabilities and hardware capabilities of different user equipment enable the user equipment to use resources of the user equipment to a maximum extent, thereby improving user experience from one or several aspects such as a response speed and a presentation effect. Compared with that a first or second user equipment can only separately select to download or download an application, in the embodiment of the present disclosure, that a second user equipment can implement associated downloading with the second user equipment improves flexibility of downloading an application. Moreover, when there are multiple first user equipment or multiple second user equipment, in the embodiment of the present disclosure, labor can be greatly saved and flexibility of downloading an application can be improved, thereby improving convenience for a user.

The embodiment of the present disclosure provides a method for downloading an application. After learning an application downloaded by a second user equipment that has an association relationship with a first user equipment, the first user equipment can automatically obtain, by providing capability information of the first user equipment and from an application server, an application to be downloaded, where the application matches the capability information of the first user equipment, thereby saving manual operation and improving flexibility of downloading an application.

Figure 6A:
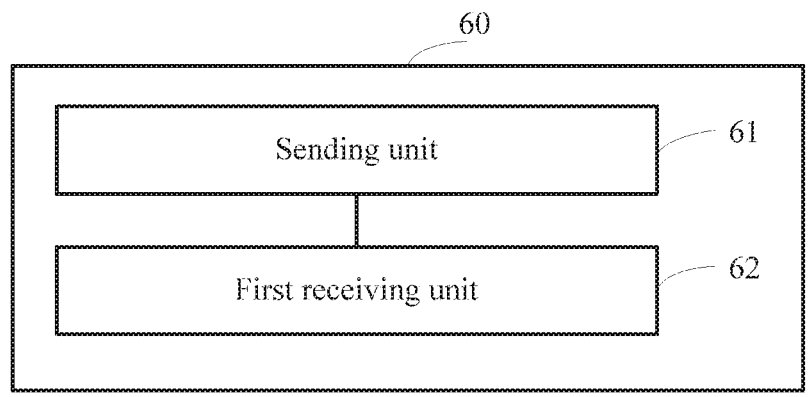
FIG. 6A and FIG. 6B are schematic block diagrams of a user equipment according to Embodiment 6 of the present disclosure.
Figure 6B:
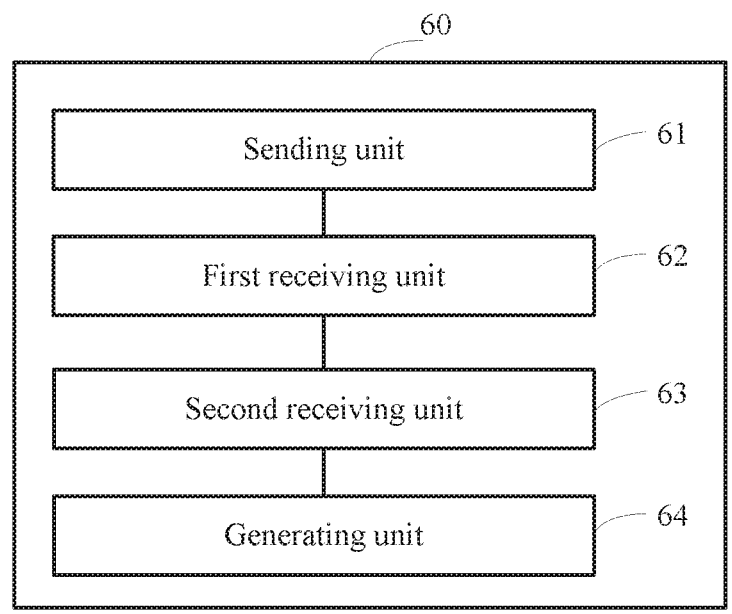

FIG. 6A and FIG. 6B are schematic block diagrams of a user equipment 60 according to Embodiment 6 of the present disclosure.

As shown in FIG. 6A, the user equipment 60 may include a sending unit 61 and a first receiving unit 62.

After the user equipment learns an application downloaded by another user equipment that has an association relationship with the user equipment, the sending unit 61 sends, to an application server, a downloading request for the application downloaded by the another user equipment, where the downloading request carries capability information of the user equipment.

The first receiving unit 62 receives an application to be downloaded, where the application matches the capability information of the user equipment and is sent by the application server based on the downloading request sent by the sending unit.

The embodiment of the present disclosure provides a user equipment for downloading an application. After learning an application downloaded by another user equipment that has an association relationship with the user equipment, the user equipment can automatically obtain, by providing capability information of the user equipment and from an application server, an application to be downloaded, where the application matches the capability information of the user equipment, thereby saving labor and improving flexibility of downloading an application.

As a different implementable manner, as shown in FIG. 6B, the user equipment 60 may further include a second receiving unit 63 and a generating unit 64.

The second receiving unit 63 receives a downloading notification sent by the another user equipment, so that the user equipment learns, according to the downloading notification, the application downloaded by the another user equipment, or the first receiving unit 62 further receives a downloading notification sent by the application server, so that the user equipment learns, according to the downloading notification, the application downloaded by the another user equipment.

The generating unit 64 generates the association relationship between the user equipment and the another user equipment, or the first receiving unit 62 receives the association relationship between the user equipment and the another user equipment, where the association relationship is generated and sent by the application server, or the second receiving unit 63 receives the association relationship between the user equipment and the another user equipment, where the association relationship is generated and sent by the another user equipment.

The generating unit 64 generates the association relationship between the user equipment and the another user equipment according to at least one piece of the following information: account information and a hardware device identifier.

The capability information, used by the sending unit 61, of the user equipment includes one or more pieces of the following information: an operating system, a screen size, screen resolution, and a supported media format.

The user equipment 60 may be one of the following apparatuses: a mobile phone, a tablet computer, a desktop computer, and a television, and implements Embodiments 1, 4 and 5. For brevity, specific details are not described herein again.

Figure 7A:
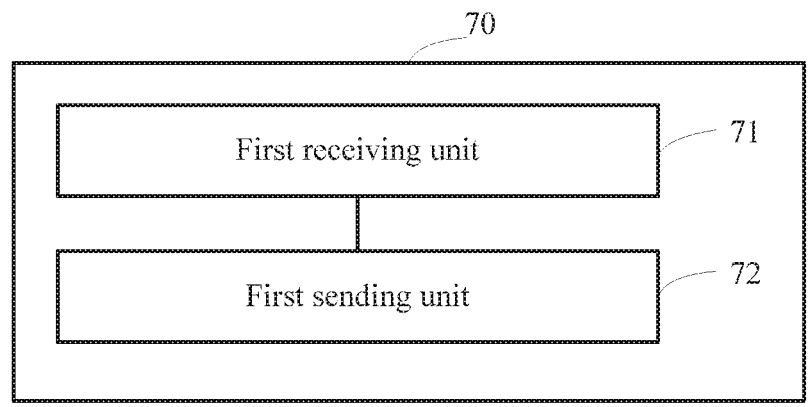
FIG. 7A and FIG. 7B are schematic block diagrams of a user equipment according to Embodiment 7 of the present disclosure.
Figure 7B:
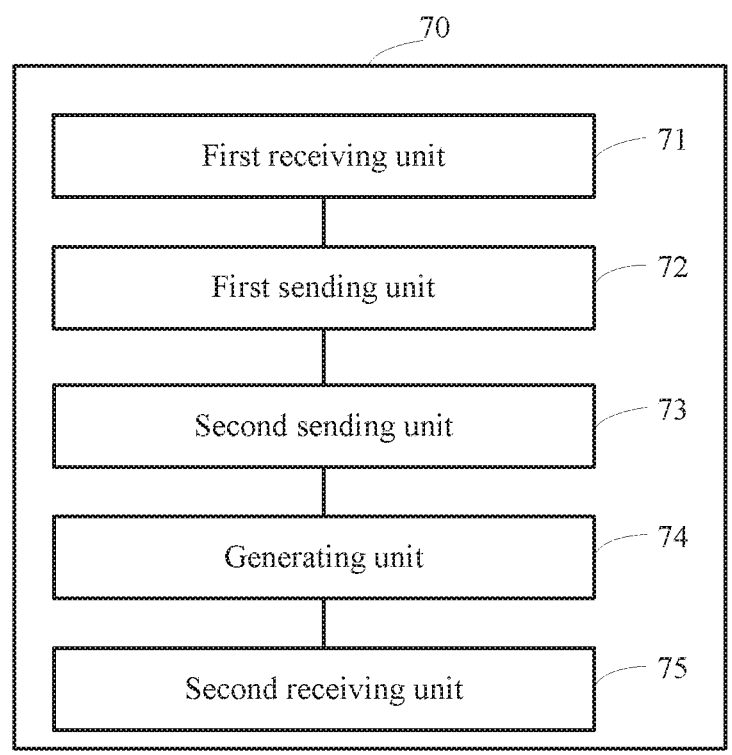

FIG. 7A and FIG. 7B are schematic block diagrams of a user equipment 70 according to Embodiment 7 of the present disclosure.

As shown in FIG. 7A, the user equipment 70 may include a receiving unit 71 and a first sending unit 72.

The first receiving unit 71 receives an application to be downloaded, where the application matches capability information of the user equipment and is sent by an application server in response to a downloading request sent by the user equipment.

The first sending unit 72 sends a downloading notification to another user equipment that has an association relationship with the user equipment, where the downloading notification is used to notify the another user equipment of the application received by the first receiving unit.

As a different implementable manner, as shown in FIG. 7B, the user equipment 70 may further include a second sending unit 73, a generating unit 74, and a second receiving unit 75.

The second sending unit 73 sends the downloading request to the application server, where the downloading request carries the capability information of the user equipment.

The generating unit 74 is configured to generate the association relationship between the user equipment and the another user equipment, or the first receiving unit 71 is further configured to receive the association relationship between the user equipment and the another user equipment, where the association relationship is generated and sent by the application server, or the second receiving unit 75 is configured to receive the association relationship between the user equipment and the another user equipment, where the association relationship is generated and sent by the another user equipment.

The generating unit 74 generates the association relationship between the user equipment and the another user equipment according to at least one piece of the following information: account information and a hardware device identifier.

The capability information, used by the first receiving unit 71, of the user equipment includes one or more pieces of the following information: an operating system, a screen size, screen resolution, and a supported media format.

The user equipment 70 may be one of the following apparatuses: a mobile phone, a tablet computer, a desktop computer, and a television, and implements Embodiments 2, 4 and 5. For brevity, specific details are not described herein again.

The embodiment of the present disclosure provides a user equipment for downloading an application. After learning an application downloaded by another user equipment that has an association relationship with the user equipment, the user equipment can automatically obtain, by providing capability information of the user equipment and from an application server, an application to be downloaded, where the application matches the capability information of the user equipment, thereby saving manual operation and improving flexibility of downloading an application.

Figure 8A:
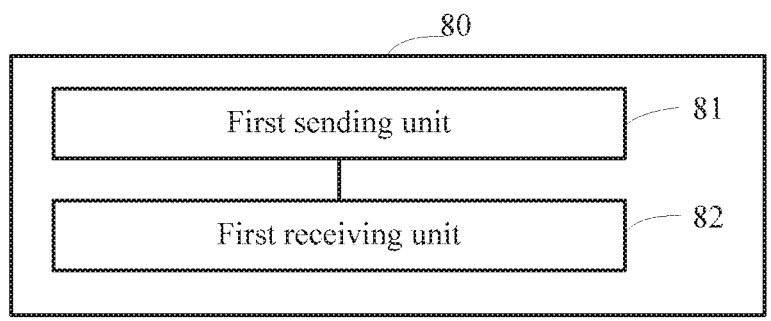
FIG. 8A and FIG. 8B are schematic block diagrams of an application server according to Embodiment 8 of the present disclosure.
Figure 8B:
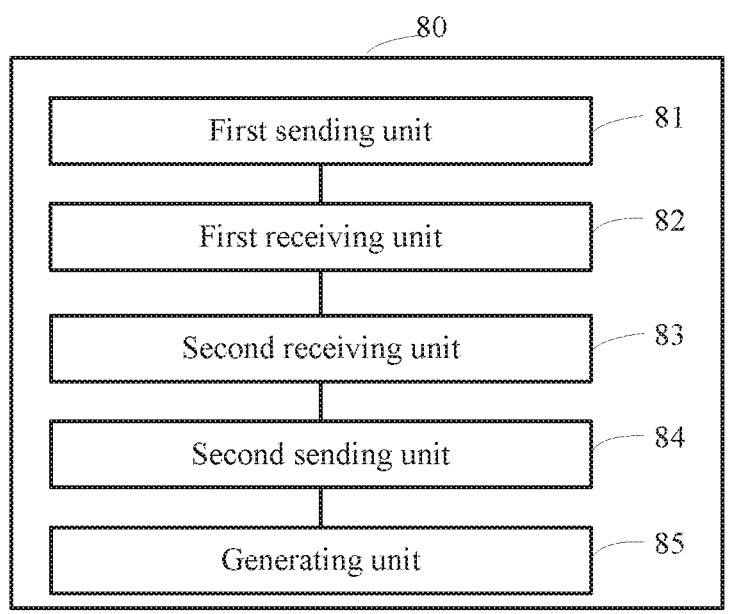

FIG. 8A and FIG. 8B are schematic block diagrams of an application server 80 according to Embodiment 8 of the present disclosure.

As shown in FIG. 8A, the application server 80 includes a first sending unit 81 and a first receiving unit 82.

The first sending unit 81 sends a downloading notification to a first user equipment, where the downloading notification is used to notify the first user equipment of an application downloaded by a second user equipment, where the second user equipment has an association relationship with the first user equipment.

The first receiving unit 82 receives a first downloading request for the application downloaded by the second user equipment, where the first downloading request is sent by the first user equipment according to the downloading notification sent by the first sending unit, and the first downloading request carries capability information of the first user equipment.

The first sending unit 81 further sends, based on the first downloading request received by the first receiving unit, an application to be downloaded to the first user equipment, where the application matches the capability information of the first user equipment.

The embodiment of the present disclosure provides an application server for downloading an application. After learning an application downloaded by a second user equipment that has an association relationship with a first user equipment, the first user equipment can automatically obtain, by providing capability information of the first user equipment and from the application server, an application to be downloaded, where the application matches the capability information of the first user equipment, thereby saving manual operation and improving flexibility of downloading an application.

As a different implementable manner, as shown in FIG. 8B, the application server 80 may further include a second receiving unit 83, a second sending unit 84, and a generating unit 85.

The second receiving unit 83 receives a second downloading request sent by the second user equipment, where the second downloading request carries capability information of the second user equipment.

The second sending unit 84 sends an application to be downloaded to the second user equipment in response to the second downloading request received by the second receiving unit, where the application matches the capability information of the second user equipment.

The generating unit 85 generates the association relationship between the first user equipment and the second user equipment.

Alternatively, the first receiving unit 82 receives the association relationship between the first user equipment and the second user equipment, where the association relationship is generated and sent by the first user equipment, or the second receiving unit 83 receives the association relationship between the first user equipment and the second user equipment, where the association relationship is generated and sent by the second user equipment.

The generating unit 85 generates the association relationship between the first user equipment and the second user equipment according to at least one piece of the following information: account information and a hardware device identifier.

The capability information, used by the first receiving unit 82, of the user equipment includes one or more pieces of the following information: an operating system, a screen size, screen resolution, and a supported media format.

The application server 80 implements Embodiments 3, 4 and 5. For brevity, specific details are not described herein again.

Figure 9:
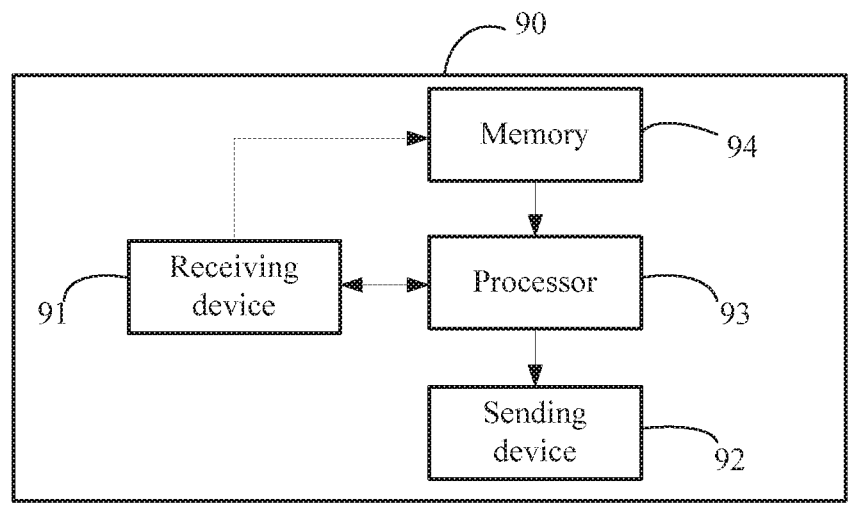
FIG. 9 is a schematic block diagram of a user equipment according to Embodiment 9 of the present disclosure.

FIG. 9 is a schematic block diagram of a user equipment 90 according to Embodiment 9 of the present disclosure.

The user equipment 90 includes a receiving device 91, a sending device 92, a processor 93, and a memory 94.

According to different user equipment and different manners of communicating with other devices, the receiving device 91 may include any proper apparatus such as a network interface card or a serial port card, or may be a wireless receiver or the like that is configured to receive a signal between devices and send the received signal to the processor.

According to different user equipment and different manners of communicating with other devices, an output device 92 may include any proper apparatus such as a network interface card and an interface card, or may be a wireless transmitter or the like that is configured to send a signal received from the processor to another device.

The memory 94 may include a random access memory (RAM) and a read only memory (ROM), or may be any fixed storage medium, or may be a removable storage medium, and is configured to store a program that can execute the embodiment of the present disclosure or data to be processed in the embodiment of the present disclosure, for example, an association relationship between user equipment.

The processor 93 is configured to execute the program of the embodiment of the present disclosure, where the program is stored by the memory, and perform bi-directional communication with another device using a bus, for example, responding to a downloading notification, sending a downloading request, and downloading an application that matches capability information of a user equipment.

During application downloading, the user equipment 90 used as an apparatus actively selecting to download an application, for example, the foregoing second user equipment, executes the following content in the embodiment of the present disclosure:

The output device is configured to, after the processor of the user equipment learns an application downloaded by another user equipment that has an association relationship with the user equipment, send, to an application server, a downloading request for the application downloaded by the another user equipment, where the downloading request carries capability information of the user equipment.

The receiving device is configured to receive an application to be downloaded, where the application matches the capability information of the user equipment and is sent by the application server based on the downloading request sent by the output device.

The receiving device is configured to receive a downloading notification sent by the another user equipment, so that the processor of the user equipment learns, according to the downloading notification, the application downloaded by the another user equipment, or the receiving device is further configured to receive a downloading notification sent by the application server, so that the processor of the user equipment learns, according to the downloading notification, the application downloaded by the another user equipment.

The processor generates the association relationship between the user equipment and the another user equipment; or the receiving device receives the association relationship between the user equipment and the another user equipment, where the association relationship is generated and sent by the application server, or the receiving device receives the association relationship between the user equipment and the another user equipment, where the association relationship is generated and sent by the another user equipment.

During application downloading, the user equipment 90 used as an apparatus that is notified to download an application, for example, the foregoing first user equipment, executes the following content in the embodiment of the present disclosure:

An input device is configured to receive an application to be downloaded, where the application matches capability information of the user equipment and is sent by an application server in response to a downloading request sent by the user equipment, and the output device is configured to send a downloading notification to another user equipment that has an association relationship with the user equipment, where the downloading notification is used to notify the another user equipment of the application received by the input device.

The output device is configured to send the downloading request to the application server, where the downloading request carries the capability information of the user equipment.

The processor is configured to generate the association relationship between the user equipment and the another user equipment, or the input device is further configured to receive an association relationship between the user equipment and the another user equipment, where the association relationship is generated and sent by the application server, or the input device is configured to receive an association relationship between a first user equipment and a second user equipment, where the association relationship is generated and sent by the another user equipment.

The processor generates the association relationship between the user equipment and the another user equipment according to at least one piece of the following information: account information and a hardware device identifier.

The capability information of the user equipment 90 includes one or more pieces of the following information: an operating system, a screen size, screen resolution, and a supported media format.

1 The user equipment 90 implements Embodiments 1, 2, 4 and 5 in the foregoing. For brevity, specific details are not described herein again. The embodiment of the present disclosure provides a user equipment for downloading an application. After learning an application downloaded by another user equipment that has an association relationship with the user equipment, the user equipment can automatically obtain, by providing capability information of the user equipment and from an application server, an application to be downloaded, where the application matches the capability information of the user equipment, thereby saving manual operation and improving flexibility of downloading an application.

Figure 10:
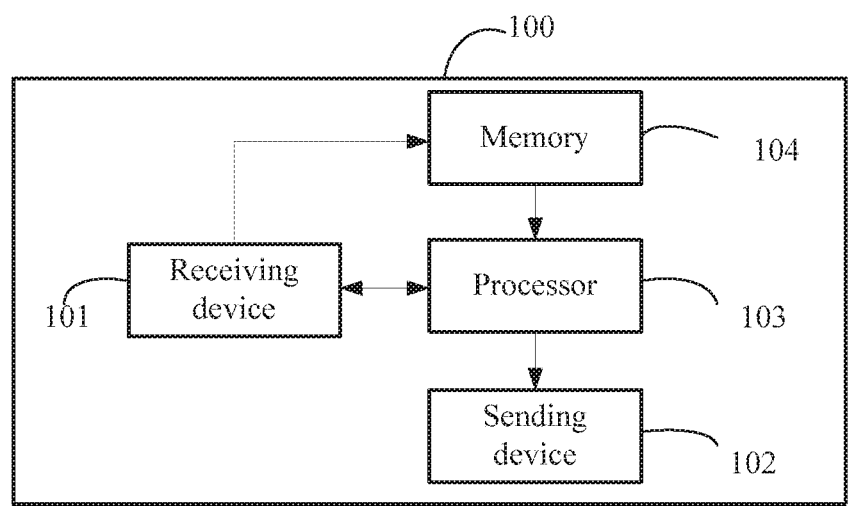
FIG. 10 is a schematic block diagram of an application server according to Embodiment 10 of the present disclosure.

FIG. 10 is a schematic block diagram of an application server 100 according to Embodiment 10 of the present disclosure.

The application server 100 includes a receiving device 101, a sending device 102, a processor 103, and a memory 104.

According to different user equipment and different manners of communicating with other devices, the receiving device 101 may include any proper apparatus such as a network interface card or a serial port card, or may be a wireless receiver or the like that is configured to receive a signal between devices and send the received signal to the processor.

According to different user equipment and different manners of communicating with other devices, an output device 102 may include any proper apparatus such as a network interface card and an interface card, or may be a wireless transmitter that is configured to send a signal received from the processor to another device.

The memory 104 may include a RAM and a ROM, or any fixed storage medium, or a removable storage medium, and is configured to store a program that can execute the embodiment of the present disclosure or data to be processed in the embodiment of the present disclosure, for example, an association relationship between user equipment.

The processor 103 is configured to execute the program of the embodiment of the present disclosure, where the program is stored by the memory; and perform bi-directional communication with another device using a bus, for example, generating a downloading notification, responding to a downloading request, and selecting an application that matches capability information of a user equipment.

The output device is configured to send a downloading notification to a first user equipment, where the downloading notification is used to notify the first user equipment of an application downloaded by a second user equipment, where the second user equipment has an association relationship with the first user equipment. The input device is configured to receive a first downloading request for the application downloaded by the second user equipment, where the first downloading request is sent by the first user equipment according to the downloading notification sent by the output device, and the first downloading request carries capability information of the first user equipment. The output device is further configured to send, based on the first downloading request received by the input device, an application to the first user equipment for downloading, where the application matches the capability information of the first user equipment.

The input device is configured to receive a second downloading request sent by the second user equipment, where the second downloading request carries capability information of the second user equipment, and the output device is configured to send an application to be downloaded to the second user equipment in response to the second downloading request received by the input device, where the application matches the capability information of the second user equipment.

The processor is configured to generate the association relationship between the first user equipment and the second user equipment, or the input device receives the association relationship between the first user equipment and the second user equipment, where the association relationship is generated and sent by the first user equipment, or the input device receives the association relationship between the first user equipment and the second user equipment, where the association relationship is generated and sent by the second user equipment.

The application server 100 implements Embodiments 3, 4 and 5 in the foregoing. For brevity, specific details are not described herein again. The embodiment of the present disclosure provides an application server for downloading an application. After learning an application downloaded by another user equipment that has an association relationship with a user equipment, the user equipment can automatically obtain, by providing capability information of the user equipment and from the application server, an application to be downloaded, where the application matches the capability information of the user equipment, thereby saving manual operation and improving flexibility of downloading an application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

A person of ordinary skill in the art may understand that all or a part of the processes of the apparatuses in the embodiments may be implemented by a computer program instructing relevant hardware. The program may be stored in a computer readable storage medium. When the program runs, the processes of the apparatuses in the embodiments are performed. The storage medium may include a magnetic disk, an optical disc, a ROM, or a RAM.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A system, comprising:
a first electronic device comprising a first processor and a first memory, wherein the first memory stores first instructions that, when executed by the first processor, cause the first electronic device to:
log into a server using an account;
send a first request for downloading a first version of an application to the server;
receive the first version of the application from the server; and
install the first version of the application;
a second electronic device comprising a second processor and a second memory, wherein the second memory stores second instructions that, when executed by the second processor, cause the second electronic device to:
log into the server using the account, wherein the account establishes a relationship between the first electronic device and the second electronic device;
automatically receive a first notification associated with the application, wherein the first notification indicates that the first electronic device has selected the first version of the application for downloading;
send, after receiving the first notification, a second request for a second version of the application to the server, wherein the second version of the application has a same application functionality as the first version of the application;
receive the second version of the application from the server; and
automatically install the second version of the application; and
a third electronic device comprising a third processor and a third memory, wherein the third memory stores third instructions that, when executed by the third processor, cause the third electronic device to:
communicatively couple with the first electronic device via a BLUETOOTH connection;
automatically receive, from the first electronic device, a second notification associated with the application via the BLUETOOTH connection between the first electronic device and the third electronic device, wherein the second notification indicates that the first electronic device has selected the first version of the application for downloading; and
automatically install a third version of the application, wherein the third version of the application has the same application functionality as the first version of the application.

2. The system of claim 1, wherein the second version of the application matches second operating system information of the second electronic device.

3. The system of claim 2, wherein the second request comprises the first operating system information of the second electronic device.

4. The system of claim 1, wherein the third version of the application matches third operating system information of the third electronic device.

5. The system of claim 1, wherein the first request comprises second operating system information of the first electronic device.

6. The system of claim 1, wherein the first version of the application and the second version of the application are different.

7. The system of claim 1, wherein the first notification is received from the server.

8. The system of claim 1, wherein the first electronic device is associated with the second electronic device according to a hardware device identifier of the first electronic device and a hardware device identifier of the second electronic device.

9. The system of claim 8, wherein the hardware device identifier of the first electronic device and the hardware device identifier of the second electronic device comprise an International Mobile Equipment Identity (IMEI).

10. A server, comprising:
a processor; and
a memory coupled to the processor and storing programming instructions that, in response to being executed by the processor, cause the server to:
receive a first request from a first electronic device for downloading a first version of an application;
send the first version of the application to the first electronic device for installation, wherein after initiating downloading of the first version of the application, a second notification associated with the application is automatically sent by the first electronic device to a third electronic device via a BLUETOOTH connection between the first electronic device and the third electronic device, wherein the second notification is used by the third electronic device to automatically install a third version of the application that has a same application functionality as the first version of the application, and wherein the second notification indicates that the first electronic device has selected the first version of the application for downloading;
automatically send a first notification associated with the application to a second electronic device based on an association relationship between the first electronic device and the second electronic device, wherein the first notification indicates that the first electronic device has selected the first version of the application for downloading;
receive, from the second electronic device, a second request for a second version of the application that has the same application functionality as the first version of the application; and
send the second version of the application to the second electronic device for installation.

11. The server of claim 10, wherein the second version of the application matches second operating system information of the second electronic device, and wherein the third version of the application matches third operating system information of the third electronic device.

12. The server of claim 11, wherein the first request comprises first operating system information of the first electronic device, and wherein the second request comprises the second operating system information of the second electronic device.

13. The server of claim 10, wherein the first version of the application and the second version of the application are different.

14. The server of claim 10, wherein the association relationship indicates that the first electronic device and the second electronic device log into the server using a common account.

15. The server of claim 10, wherein the association relationship comprises an association between a hardware device identifier of the first electronic device and a hardware device identifier of the second electronic device.

16. The server of claim 15, wherein the hardware device identifier of the first electronic device and the hardware device identifier of the second electronic device comprise an International Mobile Equipment Identity (IMEI).

\* \* \* \* \*